United States Patent [19]
Ono et al.

[11] Patent Number: 5,623,289
[45] Date of Patent: Apr. 22, 1997

[54] FACSIMILE APPARATUS WITH INK EJECTION RECORDING MEANS RECOVERABLE PRIOR TO TRANSMISSION OF IMAGE DATA BY ANOTHER FACSIMILE APPARATUS

[75] Inventors: Takeshi Ono; Fumihiko Watanabe, both of Yokohama, Japan

[73] Assignee: Canon Kabushiki Kaisha, Tokyo, Japan

[21] Appl. No.: 338,210

[22] Filed: Nov. 9, 1994

Related U.S. Application Data

[63] Continuation of Ser. No. 78,069, Jun. 18, 1993, abandoned, which is a continuation of Ser. No. 882,763, May 11, 1992, abandoned, which is a continuation of Ser. No. 531,710, Jun. 1, 1990, abandoned.

[30] Foreign Application Priority Data

Jun. 2, 1989 [JP] Japan .................................... 1-139316

[51] Int. Cl.$^6$ ................................................. B41J 2/165
[52] U.S. Cl. ................................. 347/3; 347/23; 358/296
[58] Field of Search .................................. 347/3, 23, 29, 347/30, 32, 35, 42; 358/296

[56] References Cited

U.S. PATENT DOCUMENTS

| | | | |
|---|---|---|---|
| 4,144,537 | 3/1979 | Kimura | 347/31 |
| 4,333,088 | 6/1982 | Diggins | 347/86 X |
| 4,376,283 | 3/1983 | Bower | 347/3 |
| 4,558,332 | 12/1985 | Takahashi | 347/23 X |
| 4,723,129 | 2/1988 | Endo | 347/56 |
| 4,731,639 | 3/1988 | Gutmann | 347/32 X |
| 4,839,737 | 6/1989 | Saito | 358/296 X |
| 4,897,831 | 1/1990 | Negi et al. | 370/29 |
| 4,910,506 | 3/1990 | Yoshida et al. | 340/825.07 |
| 4,947,191 | 8/1990 | Nozawa | 347/30 |
| 4,963,884 | 10/1990 | Kiguchi et al. | 346/76 PH |
| 4,967,204 | 10/1990 | Terasawa | 347/23 |
| 4,972,270 | 11/1990 | Kurtin et al. | 358/296 |
| 4,977,459 | 12/1990 | Ebinuma | 358/296 |
| 5,018,884 | 5/1991 | Hirano | 347/43 X |
| 5,206,666 | 4/1993 | Watanabe | 347/3 |
| 5,229,792 | 7/1993 | Ono | 347/3 |
| 5,404,229 | 4/1995 | Ono | 347/3 X |

FOREIGN PATENT DOCUMENTS

| | | | |
|---|---|---|---|
| 56-26254 | 8/1979 | Japan . | |
| 58-119867 | 7/1983 | Japan | B41J 3/04 |
| 58-183265 | 10/1983 | Japan | B41J 3/04 |

Primary Examiner—Joseph W. Hartary
Attorney, Agent, or Firm—Fitzpatrick, Cella, Harper & Scinto

[57] ABSTRACT

An image communication apparatus includes a communication unit for communicating a procedure signal associated with communication, and image data, a recording unit for ejecting a liquid droplet onto a recording member in accordance with image data received by the communication unit, a recovery unit for performing a predetermined recovery operation of the recording unit, and a control unit for causing the recovery unit to perform the recovery operation in accordance with a predetermined procedure signal communicated before reception of the image data.

17 Claims, 4 Drawing Sheets

FACSIMILE APPARATUS WITH INK EJECTION RECORDING MEANS RECOVERABLE PRIOR TO TRANSMISSION OF IMAGE DATA BY ANOTHER FACSIMILE APPARATUS

This application is a continuation of application Ser. No. 08/078,069, filed Jun. 18, 1993, now abandoned, which in turn was a continuation of application Ser. No. 07/882,763, filed May 11, 1992, now abandoned, which in turn was a continuation of application Ser. No. 07/531,710, filed Jun. 1, 1990, now abandoned.

BACKGROUND OF THE INVENTION

The present invention relates to an image communication apparatus for ejecting a liquid droplet onto a recording member to perform image recording.

In general, a so-called ink-jet recording system for ejecting a droplet of a liquid such as an ink onto a record sheet according to recording information to perform image recording is known.

The ink-jet recording system has the following drawbacks.

(1) The ink-jet recording system often causes a printing error due to evaporation or drying of ink or clogging of nozzles with dust, and in a non-recording state, a preservation operation of a head such as capping is necessary.

(2) In order to suppress such a printing error, head recovery operations such as idle ejection of all the nozzles, an ink supply operation, and the like must be performed before printing, and a considerable time is required until recording is ready.

(3) When a head has a large number of nozzles, in particular, in a line head, a probability of omission of printing dots is increased.

Such drawbacks pose serious problems particularly when the ink-jet recording system is applied to an apparatus which has a relatively long standby time without recording, e.g., an image communication apparatus such as a facsimile.

Therefore, an ink-jet image communication apparatus comprising a recording head having a plurality of nozzles has not been realized yet.

SUMMARY OF THE INVENTION

The present invention has been made in consideration of the above situation, and has as its object to improve an image communication apparatus for ejecting a liquid droplet onto a recording member to record an image.

It is another object of the present invention to provide an image communication apparatus which can efficiently perform a reception operation.

It is still another object of the present invention to provide an image communication apparatus which can prevent a printing error.

It is still another object of the present invention to provide an image communication apparatus which can shorten a time required until recording is started.

It is still another object of the present invention to provide an image communication apparatus which can quickly perform recovery processing of a recording head.

It is still another object of the present invention to provide an image communication apparatus which performs standby operations including a recovery operation of a recording head in response to transmission of a predetermined procedure signal after call incoming at the beginning of reception of image information, thereby shortening a time until recording is started.

The above and other objects will be apparent from the accompanying drawings and the following description of the preferred embodiment.

BRIEF DESCRIPTION OF THE PREFERRED EMBODIMENTS

FIG. 2-1 is a sectional view of an ink-jet recording apparatus of this embodiment;

FIG. 2-2 is a sectional view showing a preservation position of a recording head;

DETAILED DESCRIPTION OF THE PREFERRED EMBODIMENT

An embodiment of the present invention will be described in detail hereinafter.

A facsimile apparatus exemplified as an embodiment of the present invention has an ink-jet full-line type line head having a length corresponding to a width of the largest record sheet which can be used in recording, a head preservation means which can prevent evaporation and clogging of an ink by, e.g., capping, a head recovery means for performing idle injection of all the nozzles of the line head or ink supply to prevent a printing error, and means for shifting a head to one of a preservation position, a recovery position, and a print position for performing recording, so that the recording head is moved from the preservation position to the print position via a predetermined standby operation simultaneously with transmission of a DIS (digital identification signal) after call incoming. This facsimile apparatus does not send back a CFR (check for reception ready) signal until the standby operation is completed.

Figure 1:
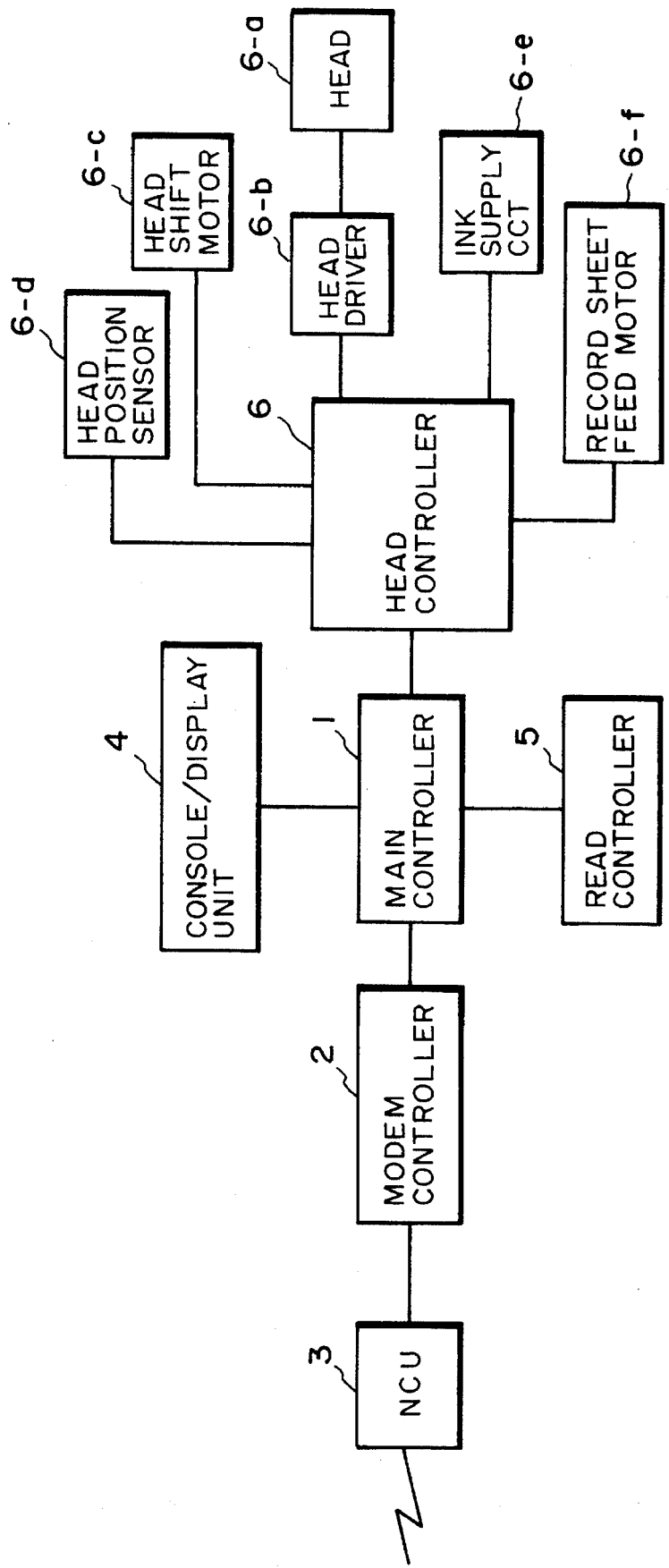
FIG. 1 is a block diagram showing an electrical arrangement of a facsimile apparatus according to an embodiment of the present invention.

FIG. 1 is a block diagram showing an embodiment of a facsimile apparatus to which the present invention is applied. In FIG. 1, a main controller 1 of the facsimile apparatus controls facsimile operations such as reading, recording, communication, and the like. A modem controller 2 is connected to a line through an NCU 3. A console/display unit 4 comprises LCDs or LEDs and key switches. A read controller 5 has CCDs or a contact sensor. A head or record controller 6 performs recording of an image read by the read controller 5 or an image received by the modem controller 2. The head controller 6 performs printing of data transferred to a head 6-a by energizing a head driver 6-b. A head shift motor 6-c shifts the head to one of the preservation, recovery, and print positions, and a head position sensor 6-d detects the position of the head. An ink supply circuit 6-e supplies an ink to the line head. The ink supply circuit 6-e performs an ink supply operation after an ink cartridge is exchanged or during a head recovery operation. A record sheet feed motor 6-f feeds a record sheet for each one-line printing operation.

Figures 1, 2:
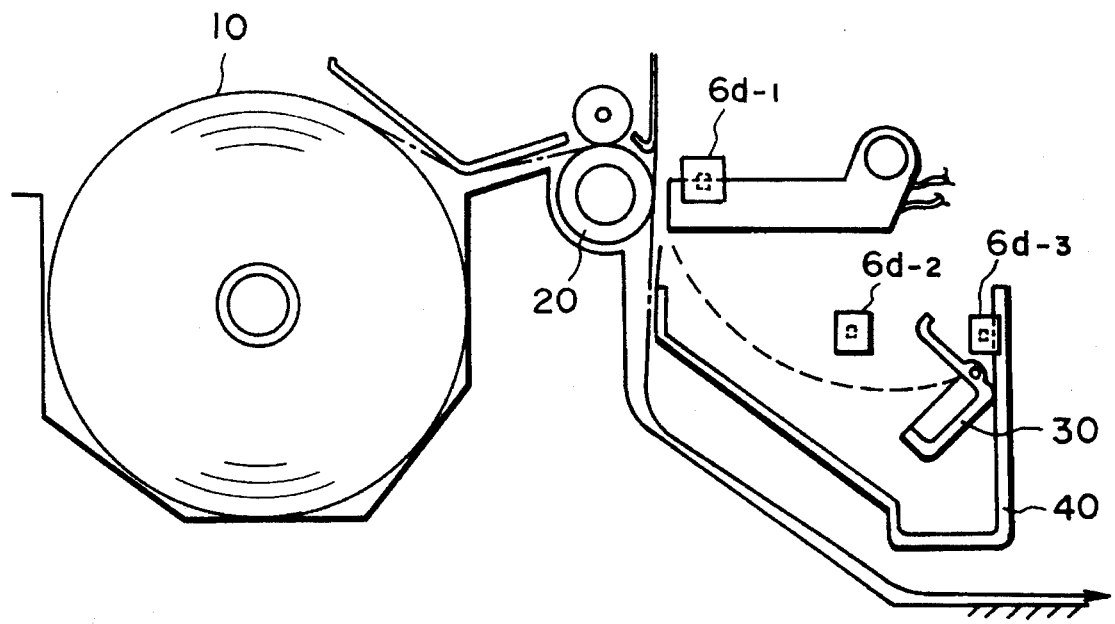
Figure 2:
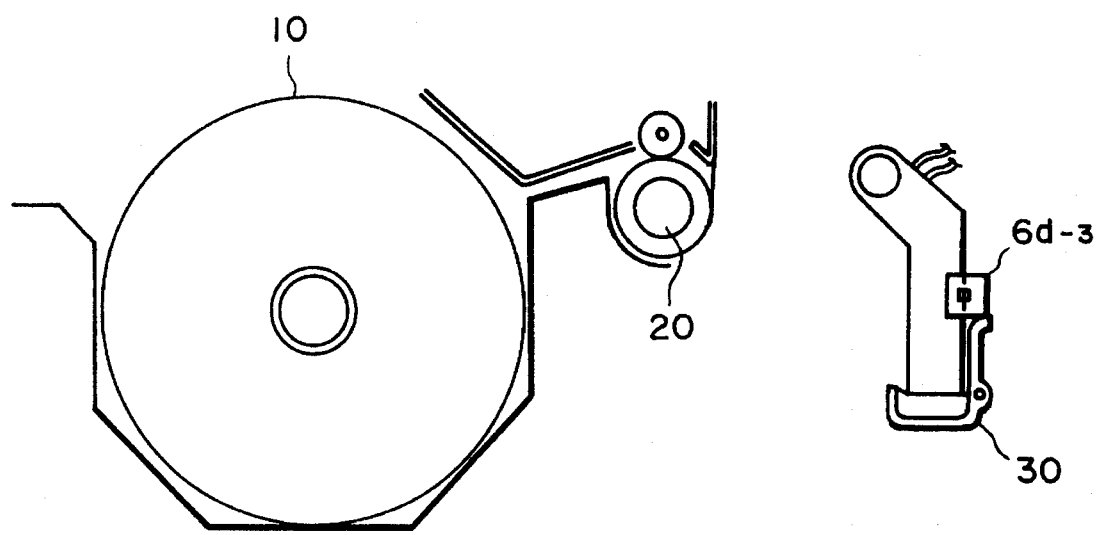

FIG. 2-1 is a cross-sectional view of an ink-jet recording apparatus mounted on the facsimile apparatus shown in FIG. 1. The recording apparatus shown in FIG. 2-1 includes a record sheet 10, a platen roller 20 for feeding the record sheet, an ink-jet head preservation cap 30, and an exhaust ink tray 40. The apparatus also includes a head print position sensor 6d-1, a recovery position sensor 6d-2, and a preservation position sensor 6d-3.

FIG. 2-2 is a view showing a state wherein the head is located at the preservation position. In this state, the nozzle surface is capped by the preservation cap 30.

Figure 3:
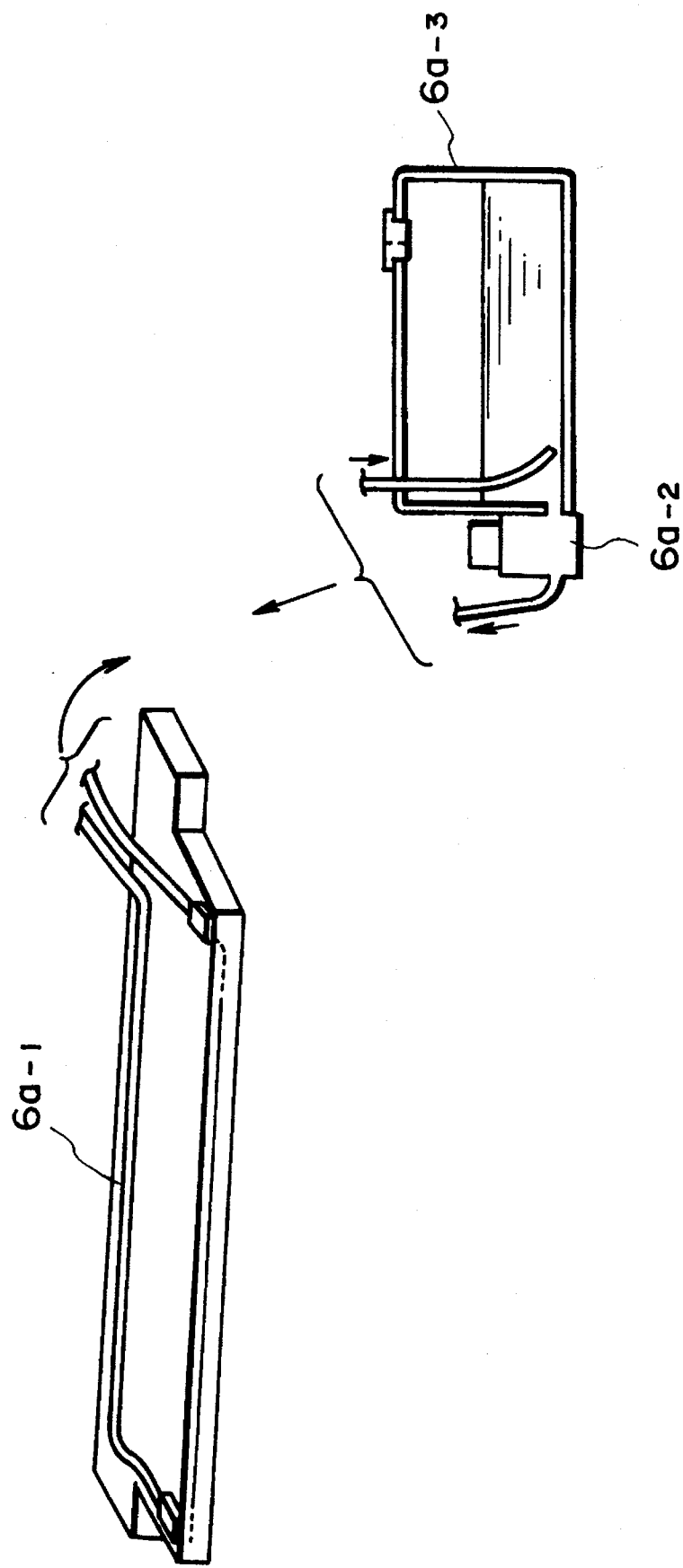
FIG. 3 is a view showing an ink-jet recording head used in this embodiment.

FIG. 3 shows the full-multi ink-jet head used in this embodiment. In this head, nozzles of one line corresponding to the width of the largest record size are aligned. In this case, head piping paths behind the nozzle array are not shown. The head shown in FIG. 3 has an ink supply pipe 6a-1. An ink is supplied from an ink tank by driving a gear pump.

The ink-jet head of this embodiment is of a bubble-jet type. In this head, an electro-thermal conversion element such as a heater is driven according to recording information to generate bubbles, thereby ejecting an ink.

Stop positions and operations of the head will be described below.

When the sensor 6d-1 shown in FIG. 2-1 is turned on, the head is located at the print position, and the head driver 6-b is turned on to perform recording. When the sensor 6d-2 is turned on, the head is located at the recovery position, and causes the ink supply circuit 6-e to perform an ink supply operation to recover a printing error caused by clogging of nozzles or evaporation of an ink or causes the head driver 6-b to perform an idle ejection operation with all black image information. Thus, an ink is forcibly ejected from injection ports to remove ink having increased viscosity in the nozzles. The removed ink is received by the exhaust ink tray 40. Furthermore, when the sensor 6d-3 is turned on, the head is located at the preservation position, and capping for preventing evaporation and clogging of an ink in a head non-use state is performed.

A gear pump 6a-2 shown in FIG. 3 supplies an ink from an ink cartridge 6a-3 to the head. The ink supply circuit 6-e shown in FIG. 1 is operated to drive this pump, thereby supplying an ink.

The recovery operation includes two kinds of operations, i.e., (1) a method of driving the pump to supply an ink, and (2) an idle ejection method of transferring all black data corresponding to one line of the head to the head, and turning on the head driver 6-b (FIG. 1) to perform a normal all black printing operation at the recovery position.

Figure 4:
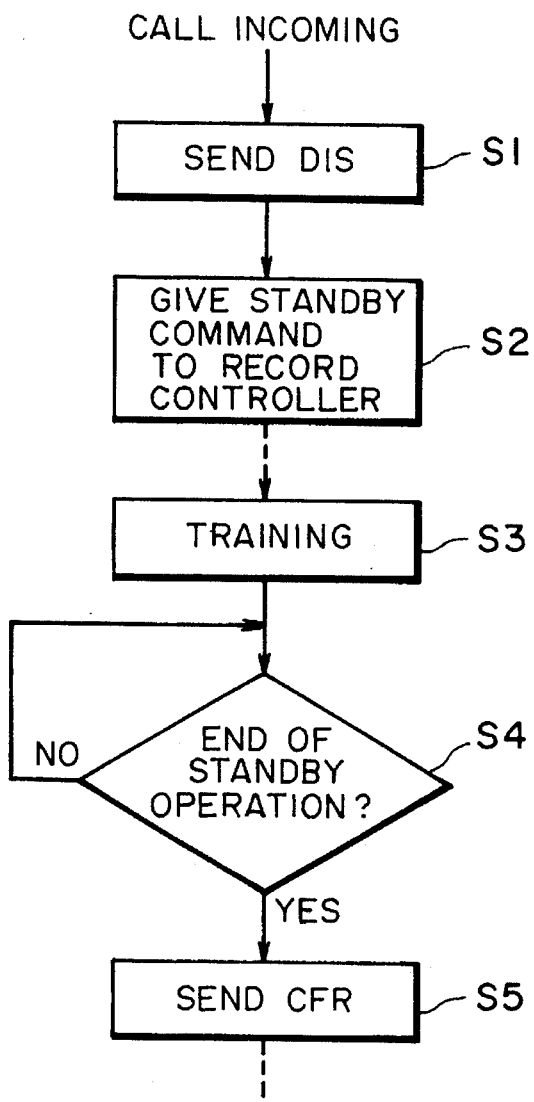
FIG. 4 is a flow chart of a main controller of this embodiment.
Figure 5:
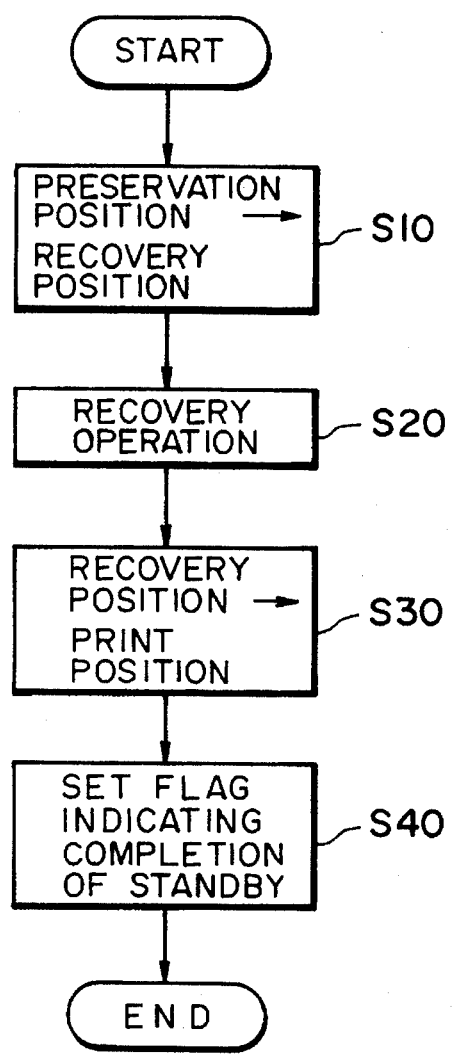
FIG. 5 is a flow chart of a head or record controller of this embodiment.

FIG. 4 is a flow chart showing an operation of the main controller 1, and FIG. 5 is a flow chart showing an operation of the record controller 6.

The overall operation of the facsimile apparatus of this embodiment will be described below with reference to the flow charts of FIGS. 4 and 5.

FIG. 4 is a flow chart of the main controller after call incoming. In step S1, a DIS (digital identification signal) is sent to a calling station. Note that the DIS is a signal for informing functions of a receiving station to a transmitting station.

In step S2, a head standby command is given to the record controller 6, and training for reception is performed in step S3. In step S4, head standby end information from the record controller 6 is waited. In step S5, a CFR (check for reception ready signal) is sent, and an image data reception operation is then started. Note that the CFR is a signal for informing that the receiving station is ready to receive the image data.

FIG. 5 is a flow chart of the record controller 6 which has received the head standby command output from the main controller 1 in step S2. In step S10, the head is shifted from the preservation position to the recovery position. After the position of the head is checked by the sensor, an ink supply or ink idle ejection operation is performed in step S20. In step S30, the head is shifted from the recovery position to the print position. In some cases, a wiping operation for removing an ink attached to nozzle ports is required. When the print position sensor of the head is turned on, completion of a standby operation is informed to the main controller 1.

In the above embodiment, the print standby operation is performed upon transmission of the DIS. However, the standby operation may be started in response to an incoming call since a print operation may be performed.

As described above, when a print operation is performed by an ink-jet recording device, the head standby operation is started in response to a digital identification signal after call incoming, thereby shortening a time required until a recording operation is started.

In this embodiment, the head recovery processing is executed in synchronism with transmission of the DIS. However, the present invention is not limited to this. For example, the recovery processing may be executed in synchronism with another procedure signal (e.g., reception of a reception mode indication signal DCS, reception of a signal TCF for checking if there is a transmission error before transmission of image data, or the like) before transmission of the CFR or in response to transmission of the CFR.

In this embodiment, a recording operation is performed by a bubble-jet system. Any other systems may be employed, as a matter of course.

The recording head is not limited to a full-multi type recording head. For example, a head which serially scans a recording member to perform image recording may be employed.

What is claimed is:

1. An image communication apparatus which records on a recording member an image according to received data by using a recording head having a plurality of recording elements for ejecting ink droplets from an ink outlet portion of said recording head, comprising:

communication means for communicating image data and protocol signals relating to communication with a partner station;

first control means for controlling a communication operation of said communication means, said first control means being adapted to receive the image data after receiving a call and then transmitting a predetermined protocol signal to the partner station;

recovery means for performing a recovery operation for recovering an ink ejection condition of said recording head;

preservation means for performing a preservation operation of the ink outlet portion; and second control means for controlling the recovery operation of said recovery means, said second control means causing said recording head to be set from a preservation position for the preservation operation to a recovery position for the recovery operation after transmission of the predetermined protocol signal, causing said recovery means to perform said recovery operation of the ink ejection condition of said recording head and causing said recording head to be set at a predetermined position for recording after completion of the recovery operation by said recovery means, wherein the recovery operation of said recovery means is performed before reception of the image data.

2. An apparatus according to claim 1, wherein said first control means outputs a predetermined signal to said second control means in response to transmission of the predetermined protocol signal after reception of the call, and said second control means causes said recovery means to perform the recovery operation in response to the predetermined signal.

3. An apparatus according to claim 1 or 2, wherein the predetermined protocol signal is a signal for informing a partner station of a faculty of said apparatus.

4. An apparatus according to claims 1 or 2, wherein said first control means transmits to the partner station a protocol signal indicating confirmation to receive after the end of the recovery operation.

5. An apparatus according to claims 1 or 2, wherein said recovery means conducts the recovery operation of the ejection condition by filling ink liquid for said recording head.

6. An apparatus according to claims 1 or 2, wherein said recovery means performs the recovery operation of the ejection condition by executing idle ejection of ink liquid from said recording head, which is not contributed to recording.

7. An apparatus according to claims 1 or 2, wherein said recording head is equipped with a plurality of recording elements which correspond to one line corresponding to a recording section on the recording member.

8. An apparatus according to claims 1 or 2, wherein said recording head ejects ink droplets by causing a change in ink condition using thermal energy generated by said recording elements.

9. An image communication apparatus which records on a recording member an image according to received image data by using a recording head for ejecting ink droplets from an ink outlet portion in accordance with image data, said apparatus comprising:

communication means for communicating image data and protocol signals relating to communication with a partner station;

recovery means for performing a recovery operation for recovering an ink ejection condition of said recording head;

preservation means for performing a preservation operation of the ink outlet portion when said recording head is not used; and setting means for setting said recording head from a preservation position for the preservation operation to a recovery position for the recovery operation after transmission of a predetermined protocol signal following reception of a communication, and for setting said recording head at a predetermined position for recording after completion of the recovery operation by said recovery means, wherein the recovery operation is performed before reception of the image data.

10. An apparatus according to claim 9, wherein the predetermined protocol signal is a digital identification signal.

11. An apparatus according to claim 9, wherein after said setting means sets said recording head at the predetermined recording position, said communication means transmit a receive-ready confirmation signal to the partner station.

12. An apparatus according to claim 9, wherein said recovery means supplies ink to said recording head to eject ink forcibly therefrom.

13. An apparatus according to claim 9, wherein the recovery operation includes an idle ejection operation by said recording head.

14. An apparatus according to claim 9, wherein said recording head has nozzles of one line corresponding to a width of the widest recording member that can be used in recording.

15. An apparatus according to claim 9, wherein said recording head comprises a plurality of nozzles and a plurality of energy generating elements driven to eject ink according to the image data.

16. An apparatus according to claim 15, wherein said recording head has nozzles of one line corresponding to a width of the widest recording member that can be used in recording.

17. An apparatus according to claim 15, wherein said energy generating elements comprises electo-thermal conversion elements for generating bubbles to eject ink.

* * * * *

UNITED STATES PATENT AND TRADEMARK OFFICE
CERTIFICATE OF CORRECTION

PATENT NO. : 5,623,289

DATED : April 22, 1997

INVENTOR(S) : TAKESHI ONO ET AL.

It is certified that error appears in the above-indentified patent and that said Letters Patent is hereby corrected as shown below:

[56] REFERENCES CITED

Foreign Patent Documents
"56-26254" should read --54-108413--.

COLUMN 1

Line 10, "1992,now" should read
--1992, now--.

COLUMN 3

Line 34, "injection" should read
--ejection--.

UNITED STATES PATENT AND TRADEMARK OFFICE
CERTIFICATE OF CORRECTION

PATENT NO.   : 5,623,289
DATED        : April 22, 1997
INVENTOR(S)  : TAKESHI ONO ET AL.

It is certified that error appears in the above-indentified patent and that said Letters Patent is hereby corrected as shown below:

<u>COLUMN 6</u>

Line 20, "transmit" should read --transmits--.
Line 42, "comprises" should read --comprise--.

Signed and Sealed this

Eighteenth Day of November 1997

Attest:

BRUCE LEHMAN

Attesting Officer          Commissioner of Patents and Trademarks